(12) United States Patent
Oswald

(10) Patent No.: US 11,820,343 B2
(45) Date of Patent: Nov. 21, 2023

(54) SYSTEM AND METHOD FOR DETECTION OF MULTI-VEHICLE SYSTEM SEPARATION

(71) Applicant: Westinghouse Air Brake Technologies Corporation, Pittsburgh, PA (US)

(72) Inventor: James A. Oswald, Coggon, IA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 36 days.

(21) Appl. No.: 17/504,633

(22) Filed: Oct. 19, 2021

(65) Prior Publication Data
US 2022/0355780 A1    Nov. 10, 2022

Related U.S. Application Data

(60) Provisional application No. 63/183,775, filed on May 4, 2021.

(51) Int. Cl.
| | | |
|---|---|---|
| *B60T 17/04* | (2006.01) | |
| *B60T 17/06* | (2006.01) | |
| *B60T 15/02* | (2006.01) | |
| *B60T 13/36* | (2006.01) | |
| *B61L 25/02* | (2006.01) | |

(52) U.S. Cl.
CPC ............ *B60T 17/04* (2013.01); *B60T 13/365* (2013.01); *B60T 15/022* (2013.01); *B60T 17/06* (2013.01); *B61L 25/02* (2013.01)

(58) Field of Classification Search
CPC ........ B60T 17/04; B60T 17/043; B60T 17/06; B60T 17/22; B60T 17/221; B60T 17/226; B60T 17/228; B60T 15/022; B60T 13/365; B61L 25/02

USPC .......................................... 303/43, 66, 80, 81
See application file for complete search history.

(56) References Cited

U.S. PATENT DOCUMENTS

| | | |
|---|---|---|
| 3,022,116 A | 2/1962 | Hewitt |
| 4,084,858 A * | 4/1978 | Engle ...................... B60T 15/60 |
| | | 303/18 |
| 9,669,818 B2 | 6/2017 | Kull et al. |
| 9,752,951 B2 | 9/2017 | Parker et al. |

(Continued)

FOREIGN PATENT DOCUMENTS

| | | | | |
|---|---|---|---|---|
| DE | 102008053994 A1 * | 5/2010 | ............. | B60T 17/04 |
| EP | 1595764 A1 * | 11/2005 | ............. | B60T 15/50 |

OTHER PUBLICATIONS

Translation, DE 10 2008 053 994 A1. (Year: 2010).*
Examination Report dated Nov. 23, 2022 for corresponding Indian Application No. 202214014220 (6 pages).

*Primary Examiner* — Thomas J Williams
(74) *Attorney, Agent, or Firm* — The Small Patent Law Group LLC; Christopher R. Carroll

(57) ABSTRACT

A leak control device includes a reservoir fluidly coupled with a brake pipe of a vehicle brake system. The leak control device also includes a conduit fluidly coupled with the reservoir and having an orifice that directs fluid out of the reservoir at a leak rate. The leak control device includes a valve fluidly coupled with and disposed between the reservoir and the conduit. The valve may open and direct the fluid out of the reservoir and out of the vehicle brake system at the leak rate responsive to a pressure of the fluid in the brake pipe being no less than a pressure of the fluid in the reservoir.

22 Claims, 3 Drawing Sheets

(56) References Cited

U.S. PATENT DOCUMENTS

| | | |
|---|---|---|
| 9,869,603 B2 | 1/2018 | Parker et al. |
| 10,124,783 B2 | 11/2018 | Spieker |
| 10,328,912 B2 | 6/2019 | Schick et al. |
| 10,836,411 B2 | 11/2020 | Kernwein et al. |
| 2012/0247189 A1 | 10/2012 | Finlay |
| 2018/0273014 A1* | 9/2018 | Boulivan .............. B60T 8/1701 |
| 2019/0009803 A1* | 1/2019 | Pollard .................... F15B 7/08 |
| 2020/0094690 A1 | 3/2020 | Sondur et al. |
| 2022/0355780 A1* | 11/2022 | Oswald ................. B60T 13/365 |

* cited by examiner

SYSTEM AND METHOD FOR DETECTION OF MULTI-VEHICLE SYSTEM SEPARATION

CROSS-REFERENCE TO RELATED APPLICATIONS

This application claims priority to U.S. Provisional Patent Application No. 63/183,775 (filed 4 May 2021), the entire disclosure of which is incorporated herein by reference.

BACKGROUND

Technical Field

The subject matter described herein relates to systems and methods that detect separation or breaking apart of multi-vehicle systems.

Discussion of Art

Multi-vehicle systems are formed from several vehicles traveling together along routes. One example of a multi-vehicle system is a rail vehicle system, or train, having multiple rail vehicles (e.g., locomotives, rail cars, rail transit vehicles, etc.) connected with each other by mechanical couplers. Trains can separate, or break apart, into separate segments for a variety of reasons. This can cause a significant drop in air pressure in a brake pipe that extends along or through the length of the train. If the brake system onboard the train is operating properly, the pressure in the two halves of the brake pipe (on different sides of the break) will significantly drop. This will cause air brakes in both halves of the separated train to apply an emergency application and stop movement of both halves of the train.

Certain failure modes of the brake system can prevent the pressure in both halves of the brake pipe from dropping for the emergency application of the air brakes. For example, valve failure, vandalization, and the like, can prevent the pressure in one or both of the halves of the brake pipe from dropping. If there is blockage in the front half of the train preventing the pressure in the section of the brake pipe in the front half of the train, then the brake pipe pressure in the front half of the train will not generate an emergency application of air brakes while the back half of the train will generate the emergency application of air brakes. A pressure sensor in an end-of-train (EOT) device will detect the drop in pressure in the back half of the train and notify the front half of the train (e.g., a controller in the front half). The front half of the train can then automatically stop the front half of the train and prevent the front half from running away from the back half of the train.

If there is blockage in the back half of the train, then the pressure drop in the front half of the train will cause emergency application of the air brakes. This stops the front half of the train and the back half of the train would run into the front half and stop.

But, if there is blockage in both the front and back halves of the train, then the brake pipe pressure in both halves of the train would not drop and no emergency application of the air brakes would occur. The EOT device would continue to report normal brake pipe pressures to the controller in the front half of the train. As a result, the back half of the train may slowly drift away from the front half of the train (when there is no locomotive or other propulsion-generating vehicle in the back half of the train), while the front half of the train would continue to move away from the back half of the train. This may continue until the EOT device would be out of range of communication with the controller. But this may allow for the back half of the train to be far enough from the front half of the train that authority roll up may be prevented and movement of other vehicles or trains may be impaired or prevented. For example, the range of the EOT device may be up to eight kilometers. This can allow for the two halves of the train to be up to eight kilometers apart before detection of the separation occurs.

BRIEF DESCRIPTION

In one embodiment, a leak control device includes a reservoir that may be fluidly coupled with a brake pipe of a vehicle brake system and to receive a fluid in the brake pipe. The reservoir may be fluidly coupled with the brake pipe at an end of the vehicle brake system that is opposite a compressor of the vehicle brake system that increases a first pressure of the fluid in the brake pipe. The leak control device also includes a conduit fluidly coupled with the reservoir and having an orifice that may direct the fluid out of the reservoir at a leak rate. The leak control device includes a valve fluidly coupled with and disposed between the reservoir and the conduit. The valve may open and direct the fluid out of the reservoir and out of the vehicle brake system at the leak rate responsive to the first pressure of the fluid in the brake pipe being no less than a second pressure of the fluid in the reservoir.

In another example, a method is provided that includes receiving fluid in a brake pipe of a vehicle brake system into a reservoir of a brake leakage device that is fluidly coupled with the brake pipe at an end of the vehicle brake system that is opposite a compressor of the vehicle brake system that increases a first pressure of the fluid in the brake pipe, and leaking the fluid out of the reservoir of the brake leakage device and out of the vehicle brake system via a conduit having an orifice. The fluid leaks out of the reservoir and the brake leakage device responsive to a first pressure of the fluid in the brake pipe being no less than a second pressure of the fluid in the reservoir. The method also includes stopping leakage of the fluid out of the reservoir and out of the vehicle brake system via the conduit having the orifice responsive to the first pressure of the fluid in the brake pipe being less than the second pressure of the fluid in the reservoir.

In another example, a system includes a leading segment locator device configured to be disposed onboard a leading segment of a multi-vehicle system. The leading segment locator device may determine locations of the leading segment of the multi-vehicle system. The system also includes a trailing segment locator device that may be disposed onboard a trailing segment of the multi-vehicle system. The trailing segment locator device may determine locations of the trailing segment of the multi-vehicle system. The system includes a controller that may receive the locations of the leading segment of the multi-vehicle system from the leading segment locator device and the locations of the trailing segment of the multi-vehicle system from the trailing segment locator device. The controller may identify separation of the leading segment of the multi-vehicle system from the trailing segment of the multi-vehicle system based on the locations of the leading segment received from the leading segment locator device and the locations of the trailing segment received from the trailing segment locator device.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
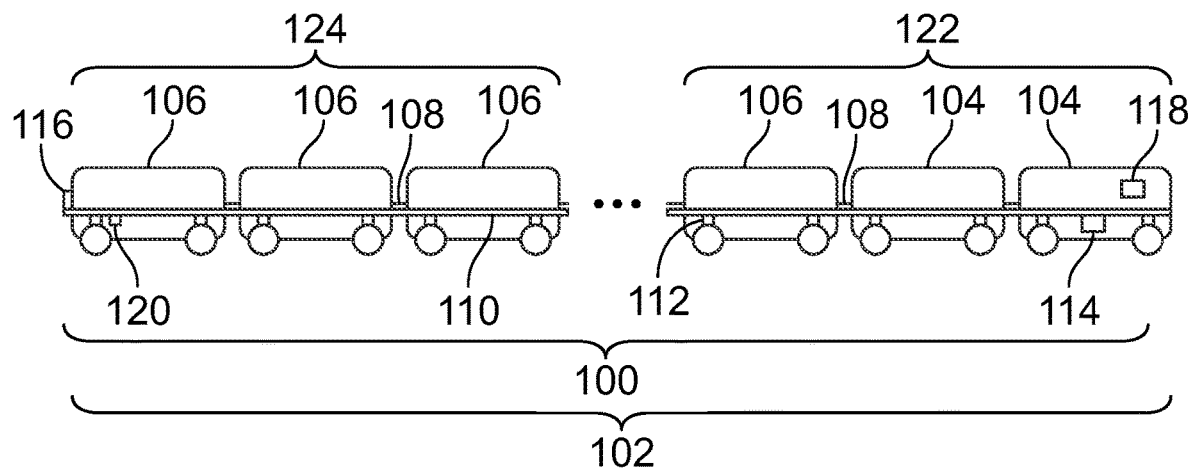
FIG. 1 illustrates one example of a detection system.

Embodiments of the subject matter described herein relate to systems and methods that detect separation of a multi-vehicle system more quickly than known systems. One embodiment of the inventive systems and methods described herein include a leak control device coupled with a brake pipe of a multi-vehicle system in a location that is closer to the rear end of the multi-vehicle system than the leading end of the multi-vehicle system.

The leak control device introduces a small amount of leakage in the brake pipe. The rate of leakage is small enough such that a compressor in the vehicle system can still maintain brake pipe pressure above a threshold at which an emergency brake application occurs. Stated differently, the leak is small enough that the compressor can generate or increase the air pressure in the brake pipe at a rate that is at least as fast as the leakage rate to prevent an emergency brake application when the brake pipe remains intact.

The leak control device can adjust the leakage rate based on the size of the vehicle system. For example, the leakage rate can be changed based on the number of vehicles in the vehicle system so that longer vehicle systems can use a faster leakage rate (as there may be more air in the brake pipe between the rear end of the vehicle system and blockage in the brake pipe).

The leak control device includes a reservoir and a valve, such as a slide valve. The reservoir of the leak control device may be fluidly coupled with the brake pipe such that the reservoir receives air from the brake pipe. When the brake pipe pressure equals or is approximately equal to the pressure in the reservoir, the valve opens to allow leakage of air out of the brake pipe. As used herein, approximately equal can mean when two values are within a threshold of each other, such as within 1%, within 3%, or within 5% of each other.

If the brake pipe pressure drops below the pressure in the reservoir, the valve closes and blocks or otherwise stops the leak. This causes the air pressure in the brake pipe to hold (e.g., not decrease). This ensures that the air brakes have the ability to brake, and the pressure not slowly increase as the leakage continues to decrease the brake pipe pressure. Once the brake pipe pressure increases again (e.g., due to release of air brakes), the valve changes position to charge the reservoir (e.g., increase the pressure in the reservoir of the device) and again introduce the leak.

This system and method solves the problem of the situation where there is blockage in the brake pipe on both sides of a break in the brake pipe and the break cannot otherwise be detected before a loss in communication between an end of vehicle system (EOVS) device (such as an EOT device) and the controller on different sides of the break. The leak introduced by the leak control device allows the EOVS device to report the drop in brake pipe pressure after the break before the EOVS device is outside of communication with the controller. The break could be detected quickly so that the vehicle system safely stops, and any authority rollup is prevented until the rear end location of the vehicle system can be determined. Additionally, a safety benefit is that due to the leakage, the brakes will be applied on the trailing or back end of the vehicle system that has broken in two more quickly than if the device was not present. This can prevent the trailing or back end of the vehicle system from crashing into the front end of the vehicle system the next time the front end of the vehicle system slows or stops. If the front end of the vehicle system passes over or through a switch in a track and the switch then changes position for another vehicle system when the trailing or back end of the vehicle system passes over or through the switch, the device can cause the trailing or back end to stop movement before the trailing or back end moves too far through the switch.

Optionally, the EOVS device can include a turbine that generates electric energy (e.g., current) for powering one or more powered components of the EOVS device and/or charging one or more energy storage devices of the EOVS device (e.g., batteries, capacitors, etc.). The powered components can include a communication device, pressure sensors, location determining devices (e.g., receivers of global navigation satellite systems) or the like. The leak that is controlled by the leak control device can be directed toward or into this turbine to cause rotation of the turbine and generate the electric energy to power the powered components and/or charge the energy storage device(s).

Optionally, the system and method can rely on location determining devices to determine when the vehicle system has separated. These devices can include global navigation satellite system (GNSS) receivers, such as global positioning system (GPS) receivers. The location determining devices can repeatedly determine and communicate the locations of the location determining devices to a controller of the vehicle system. The controller can identify whether and when the vehicle system separates into two based on relative changes in the locations reported by the location determining devices.

FIG. 1 illustrates one example of a detection system 100. The detection system detects when a multi-vehicle system 102 breaks apart. The multi-vehicle system includes two or more vehicles 104, 106 that travel together along routes. The vehicles 104 represent propulsion-generating vehicles. Suitable propulsion-generating vehicles may include locomotives, trucks, and the like. The vehicles 106 represent non-propulsion-generating vehicles. Suitable non-propulsion-generating vehicles may include rail cars, passenger cars, trailers, barges, and the like. The number and arrangement of the vehicles shown in FIG. 1 is provided as one example. A different number of vehicles or a different arrangement of vehicles may be provided in other embodiments, as represented by the ellipsis shown in FIG. 1. While one or more embodiments of the subject matter described herein relate to rail vehicle systems such as trains, not all embodiments are limited to trains. For example, at least one embodiment may relate to systems and methods that detect separation of other vehicle systems, such as a truck and trailer.

In the illustrated example, the vehicles are mechanically coupled with each other by couplers 108. The vehicle system may separate or break apart when the vehicle system is divided into separate sections that are no longer coupled with each other (e.g., by a coupler between the sections). For example, the vehicle system may separate into a front or leading end segment 122 and a rear or trailing end segment 124. In one embodiment, the leading end segment includes at least one propulsion-generating vehicle while the trailing end segment does not include any propulsion-generating vehicles. Alternatively, each of the leading and trailing end segments can include at least one propulsion-generating vehicle. In other embodiments, the vehicles may form a virtual group.

A brake system of the vehicle includes a brake pipe 110 that extends through the vehicles to carry fluid pressure (e.g., air pressure) along the length of the vehicle system and to air brakes 112 onboard the vehicles. A compressor 114 disposed onboard at least one of the vehicles can increase the air pressure by compressing air and directing the compressed air into the brake pipe. Changes in air pressure in the brake pipe can cause the brakes to engage or release.

The detection system may include an EOVS device 116 disposed onboard the vehicle at the trailing end of the vehicle system (relative to a direction of travel of the vehicle system). In one embodiment, the controller and compressor are located in the leading end segment of the vehicle system while the EOVS device is located in the trailing end segment of the vehicle system. If the vehicle system is a rail vehicle system, then the EOVS device can be an EOT device. Alternatively, the EOVS device can represent another device. The EOVS device can include one or more powered components, such as a communication device, pressure sensor, location determining device, or the like. The communication device can be transceiving hardware, such as an antenna, modem, etc. The pressure sensor can measure air pressures in the brake pipe and/or in other locations. The location determining device can be a GNSS device (e.g., a GNSS receiver, GPS receiver, etc.).

The detection system also includes a controller 118 that can communicate with the EOVS device and optionally can control operation of the vehicle system. For example, the controller can represent hardware circuitry that includes and/or is connected with one or more processors that control operation of propulsion systems (e.g., engines, motors, etc.) of the vehicles 104, brakes of the vehicle system, or the like. The controller can control operation of the vehicle system based on operator input and/or autonomously.

The detection system includes a leak control device 120. The leak control device is shown as being disposed onboard the last or end vehicle of the vehicle system, but optionally can be disposed onboard another vehicle. The leak control device can be positioned on the vehicle system to assist with the faster detection of separation of the vehicle system in a location between the leak control device and a source of air pressure in the brake pipe, such as the compressor.

Figure 2:
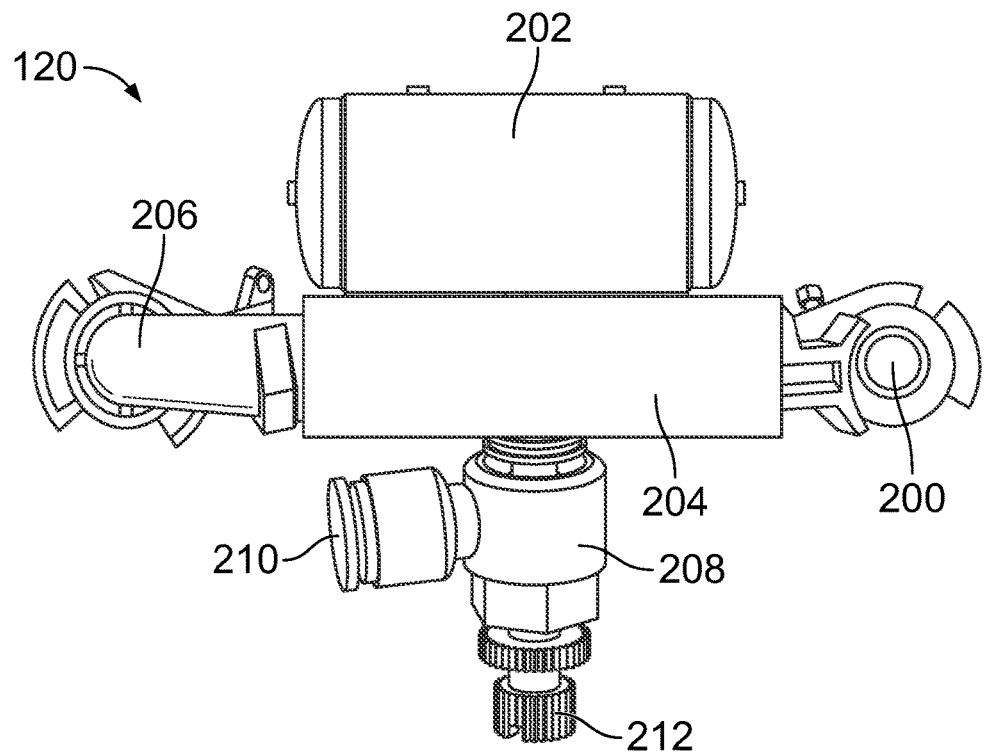
FIG. 2 illustrates one example of a leak control device shown in FIG. 1.

FIG. 2 illustrates one example of the leak control device shown in FIG. 1. The leak control device includes an inlet conduit 200 that is fluidly coupled with the brake pipe and through which the leak control device receives air pressure from the brake pipe. The leak control device also includes a reservoir 202 that is fluidly coupled with the brake pipe via the inlet conduit and a valve 204 of the leak control device. Air in the brake pipe can flow though the inlet conduit and the valve and into the reservoir. The leak control device optionally can include an outlet conduit 206 that is fluidly coupled with the inlet conduit by the valve. The outlet conduit can be fluidly coupled with the brake pipe. This can allow for fluid in the brake pipe to flow through the inlet conduit, the valve, and out of the leak control device back into the brake pipe via the outlet conduit. In this way, the leak control device can form a short bypass of the brake pipe but allow the fluid pressure in the brake pipe downstream of the leak control device to be measured by the EOVS device. Alternatively, the leak control device does not include the outlet conduit.

The leak control device includes a leak conduit 208 that is fluidly coupled with the valve, the brake pipe, and the reservoir. The leak conduit has an orifice or vent 210 through which fluid in the reservoir and brake pipe can leak out of the brake pipe and the leak control device. The orifice may direct the leaking fluid (e.g., air) into an ambient environment outside of the vehicle system. Alternatively, the orifice may direct the leaking fluid in another direction, such as inside the vehicle system.

The valve can be a slide valve or another type of valve that alternates between different positions based on the pressure of the fluid in the reservoir and the pressure of the fluid in the brake pipe. In one position (e.g., an open position), the valve directs fluid in the brake pipe out of the leak control device at a controlled leak rate via the inlet conduit, the valve, the leak conduit, and the vent. In a different position (e.g., a closed position), the valve directs fluid in the brake pipe into the reservoir via the inlet conduit and the valve. Optionally, the valve may direct a first portion of some (but not all) of the fluid in a segment of the brake pipe that is upstream of the leak control device into the reservoir via the valve and direct a second portion of some (but not all) of the fluid in the upstream segment of the brake pipe into a downstream segment of the brake pipe (that is downstream from the leak control device) via the inlet conduit, the valve, and the outlet conduit.

The valve can switch to the open position to direct the fluid out of the brake pipe via the leak conduit at a leak rate responsive to the pressure of the fluid in the brake pipe being no less than the pressure of the fluid in the reservoir. For example, while the pressure in the brake pipe is the same as or greater than the pressure in the reservoir, the valve directs the fluid out of the brake pipe via the vent at a leak rate. The leak rate can be slow enough that the compressor is able to backfill the air pressure in the brake pipe to prevent an emergency application of the air brakes. The leak can be a continuous leak or a leak that repeatedly starts and stops. The valve also can change positions and close to stop leakage of the fluid out of the leak conduit responsive to the pressure of the fluid in the brake pipe being less than the pressure of the fluid in the reservoir.

The valve remains open to allow leakage of the fluid in the brake pipe and the reservoir out of the brake pipe and the vehicle system responsive to the vehicle system separating into multiple segments. For example, a coupler in the vehicle system shown in FIG. 1 may break or otherwise allow the vehicle system to separate into different segments, with each segment including one or more vehicles. A front end or leading end segment can include the vehicle with the compressor, while a separate rear end or trailing end segment that is separate from the front end or leading end segment can include the leak control device. A break in the brake pipe may occur with or without the vehicle system separating into two or more separate segments. There may be blockage in the brake pipe in both the front or leading end segment of the vehicle system and in the rear or trailing end segment of the vehicle system. The blockages can be due to malfunctioning equipment (e.g., valves), vandalism, or the like. The front end blockage can prevent the pressure in the brake pipe in the front or leading end segment from dropping enough to cause an emergency application of the brakes in the vehicles in the front or leading end segment. The back end blockage can prevent the pressure in the brake pipe in the rear or trailing end segment from dropping enough to cause an emergency application of the brakes in the vehicles in the rear or trailing end segment.

But the valve of the leak control device can remain open due to the pressure in the brake pipe being no less than the pressure in the reservoir (due to the back end blockage preventing a reduction in the pressure in the brake pipe). This valve remaining open allows the fluid (e.g., air) in the reservoir and then the fluid in the brake pipe to drain out of the brake pipe segment in the rear or trailing end segment of the vehicle system via the leak control device. The leak will continue until the pressure in this segment of the brake pipe decreases enough to cause an emergency application of the brakes. This can ensure or increase the likelihood of the EOVS device detecting the loss or decrease in pressure in the rear or trailing end segment of the brake pipe and/or the emergency brake application sooner than if the leak via the leak control device was not present. As a result, the separation of the brake pipe and/or vehicle system can be detected faster.

The EOVS device can identify the pressure drop in the brake pipe (e.g., using a pressure sensor of the EOVS) due to the separation of the vehicle system and the leak controlled by the leak control device. The EOVS can send a signal to the controller in the other segment of the vehicle system to notify the controller of the loss of integrity of the vehicle system. As a result, the controller can implement one or more responsive actions, such as automatically slowing or stopping the vehicle system. For example, the controller can issue a command for all vehicles or at least the vehicles that the controller can still communicate with to automatically slow or stop movement (e.g., by decreasing throttle and/or braking). This can prevent the leading segment of the vehicle system from running away from the trailing segment of the vehicle system.

The leak control device also operates to allow the pressure in the brake pipe to be controlled for brake applications in situations where the brake pipe is intact. For example, if the fluid pressure in the brake pipe decreases below the fluid pressure in the reservoir of the leak control device, the valve in the leak control device changes positions (in response to this pressure decrease) to close. This position of the valve stops the leak of fluid out of the leak conduit of the leak control device and allows the reservoir of the leak control device and the brake pipe to hold (or maintain) fluid pressure. This position of the valve also ensures that any commanded or called for brake application can be maintained (by a commanded drop in the fluid pressure in the brake pipe) and not increase over time (as would occur if the leak out of the leak conduit would be allowed to continue). The fluid pressure in the brake pipe may subsequently increased (e.g., during recharging of the brake pipe following release of the brakes). Once the pressure in the brake pipe increases enough to be no less than the pressure in the reservoir, the position of the valve can change again (e.g., to open) and permit the fluid to leak out of the leak conduit. Because the compressor in the leading or front end segment of the vehicle system is increasing pressure in the brake pipe at a rate that exceeds any drop in pressure caused by the controlled leak out of the leak conduit, the pressure within the brake pipe can be maintained while there is no break in the brake pipe.

The orifice or vent of the leak control device can be a controllable orifice or vent. For example, the size (e.g., diameter or radius) of the orifice can be increased to increase the leak rate or can be decreased to decrease the leak rate. The size of the orifice can be changed using an input device 212 of the leak control device. In the illustrated example, the input device is a manually rotatable dial that is rotated in one direction to increase the size of the orifice and is rotated in an opposite direction to decrease the size of the orifice (and/or close the orifice). Optionally, the input device can be rotated by one or more motors under control of the controller to remotely control the leak rate from the vehicle on which the controller is located.

The leak rate can be adjusted based on the size of the vehicle system. For example, the leakage rate can be increased in proportion to the length of the brake pipe and/or number of vehicles in the vehicle system increasing. This increase may be linearly proportional or increase in a non-linear manner with the increasing length of the brake pipe and/or number of vehicles. Similarly, the leakage rate can be decreased in proportion to the length of the brake pipe and/or number of vehicles in the vehicle system decreasing. This decrease may be linearly proportional or decrease in a non-linear manner with the decreasing length of the brake pipe and/or number of vehicles. Increasing the leakage rate for longer vehicle systems and/or longer brake pipes can reduce a delay between separation of the vehicle system into separate segments and detection of the pressure drop in the trailing segment of the vehicle system and brake pipe. While longer brake pipes may hold more fluid than shorter brake pipes, the increased leakage rate used for longer brake pipes may shorten the time needed for the fluid pressure in the brake pipe to drop by an amount that can be detected by the EOVS device (shorten the time relative to the same length of brake pipe but using a slower leakage rate).

Figure 3:
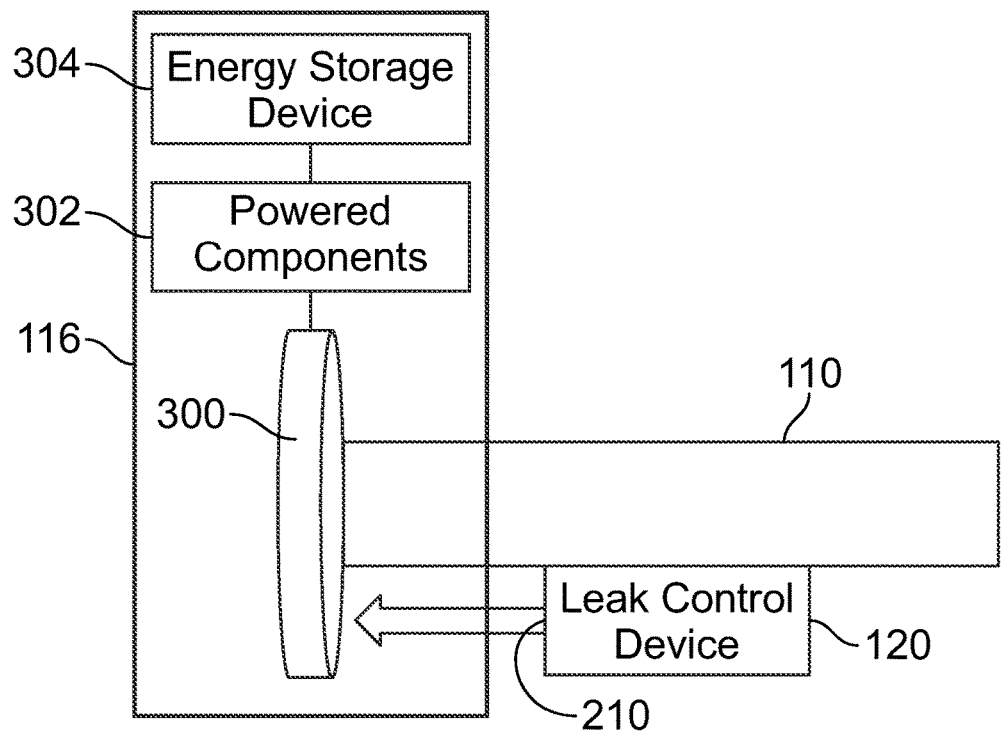
FIG. 3 illustrates another example of an end-of-vehicle system device and the leak control device shown in FIG. 1.

FIG. 3 illustrates another example of the EOVS device 116 and the leak control device 120 shown in FIG. 1. The EOVS device may include a turbine 300 that is rotated by the flow of fluid through the turbine to generate electric energy (e.g., electric current, such as direct current or alternating current). The electric energy generated by rotation of the turbine is conducted (via wires, cables, buses, or the like) to one or more powered components 302 of the EOVS device and/or one or more energy storage devices 304 of the EOVS device.

The powered components can include a pressure sensor that measures the pressure in the brake pipe, a communication device that communicates with the controller and/or one or more off-board systems, a camera, or the like. The energy storage devices can include one or more battery cells, capacitors, or the like, that can store the electric energy generated by the turbine for powering the powered components (e.g., when there is in sufficient fluid movement through the turbine to power the powered components and/or when the turbine generates more energy than is needed to power the powered components).

The orifice or vent 210 of the leak control device can be oriented to direct the leaking fluid out of the leak control device toward or into the turbine. This can cause the leaking brake pipe fluid to be directed into the turbine and cause rotation of the turbine to power the powered components and/or charge the energy storage device(s).

Figure 4:
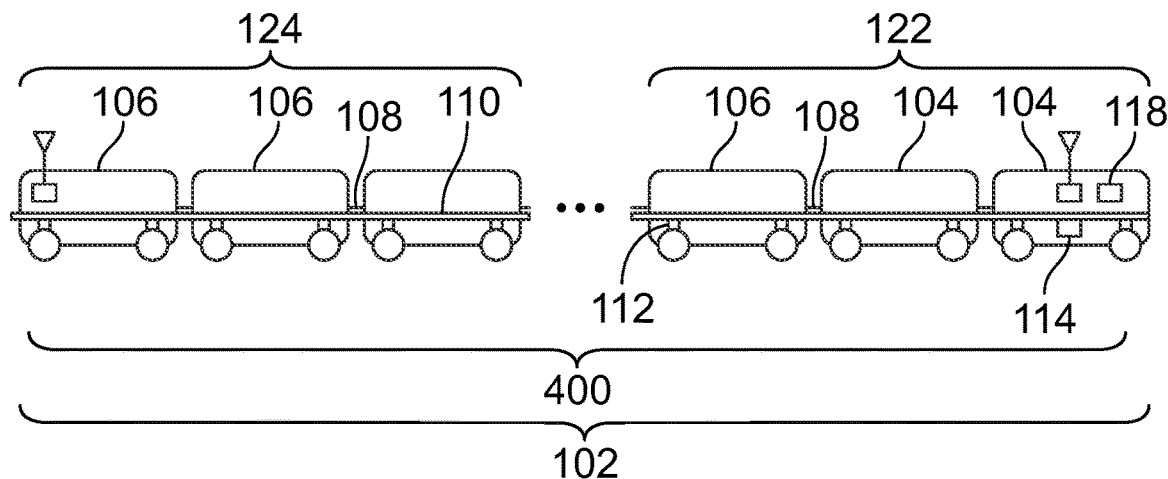
FIG. 4 illustrates another embodiment of a detection system.

FIG. 4 illustrates another embodiment of a detection system 400. The detection system shown in FIG. 4 can detect when the vehicle system has separated into two or more segments so that responsive action may be taken (e.g., stopping movement of the front or leading end segment of the vehicle system). The detection system shown in FIG. 4 includes locator devices 402, 404 disposed in different locations in the vehicle system, such as onboard different vehicles in the same vehicle system. In one embodiment, one or more vehicles closer to a leading end 406 of the vehicle system include the locator device 402, which can be referred to as a leading segment locator device. One or more other vehicles closer to an opposite, trailing end 408 of the vehicle system include the other locator device 404, which can be referred to as a trailing segment locator device.

Each of the locator devices can include a GNSS receiver that receives wireless signals from off-board sources, such as satellites, beacons, repeaters, or the like, and determine locations, moving speeds, headings, etc., of each of the locator devices using those signals. The locator devices can communicate the locations, moving speeds, headings, etc., to the controller 118. The information that is determined and/or communicated from the locator devices to the controller can be referred to as location data, even though this information may include or relate to information other than locations.

The controller examines the location data reported by the locator devices and determines whether the vehicle system has separated into separate segments based on the location data and/or changes in the location data. For example, the controller can examine the locations reported by each of the locator devices and calculate changes or rates of change in the reported locations. So long as the vehicles on which the locator devices are disposed remain coupled with each other in the same vehicle system, the locations reported by the locator devices should change by similar amounts and/or the rates of change in the locations (e.g., the amount of change in the locations divided by the time between when the locations are measured or reported) should be similar. The controller can calculate changes in the locations or rates of the changes in the locations reported by the leading segment locator device and calculate changes in the locations or rates of the changes in the locations reported by the trailing segment locator device.

If the controller determines that the changes in the locations reported by the leading segment locator device are within a threshold amount (e.g., within 1% of each other, within 3% of each other, or within 5% of each other in different embodiments) of the changes in the locations reported by the trailing segment locator device, then the controller can determine that the vehicle system is intact and has not separated (at least in a location between the leading and trailing segment locator devices). But, if the controller determines that the changes in the locations reported by the leading segment locator device are not within the threshold amount of the changes in the locations reported by the trailing segment locator device, then the controller can determine that the vehicle system is not intact and may have separated (at least in a location between the leading and trailing segment locator devices). The locations reported by the leading segment locator device may change by longer distances than the locations reported by the trailing segment locator device when the vehicle system has separated. As a result, the controller can implement one or more responsive actions, such as automatically slowing or stopping the vehicle system. For example, the controller can issue a command for all vehicles or at least the vehicles that the controller can still communicate with to automatically slow or stop movement (e.g., by decreasing throttle and/or braking).

As another example, if the controller determines that the rate of change in the locations reported by the leading segment locator device are within a threshold amount (e.g., within 1% of each other, within 3% of each other, or within 5% of each other in different embodiments) of the rate of change in the locations reported by the trailing segment locator device, then the controller can determine that the vehicle system is intact and has not separated (at least in a location between the leading and trailing segment locator devices). But, if the controller determines that the rate of change in the locations reported by the leading segment locator device are not within the threshold amount of the rate of change in the locations reported by the trailing segment locator device, then the controller can determine that the vehicle system is not intact and may have separated (at least in a location between the leading and trailing segment locator devices). The rate of change in the locations reported by the leading segment locator device may be greater (e.g., the locations change at a faster rate) than the rate of change in the locations reported by the trailing segment locator device when the vehicle system has separated. As a result, the controller can implement one or more responsive actions, as described above. The threshold amount may be designated or determined to account for vehicle system "run in" and "run out." That is, due to coupling slack of couplers that connect certain segments of a multi-segment vehicle system to one another (e.g., locomotives and rail cars of a train), the location of a leading segment may change while the location of a trailing segment does not (or vice versa), until the couplers are fully stretched or fully bunched. The amount or degree of such coupler play can be determined based on the mechanical configuration of the couplers and the number of segments in the vehicle system, for example.

Figure 5:
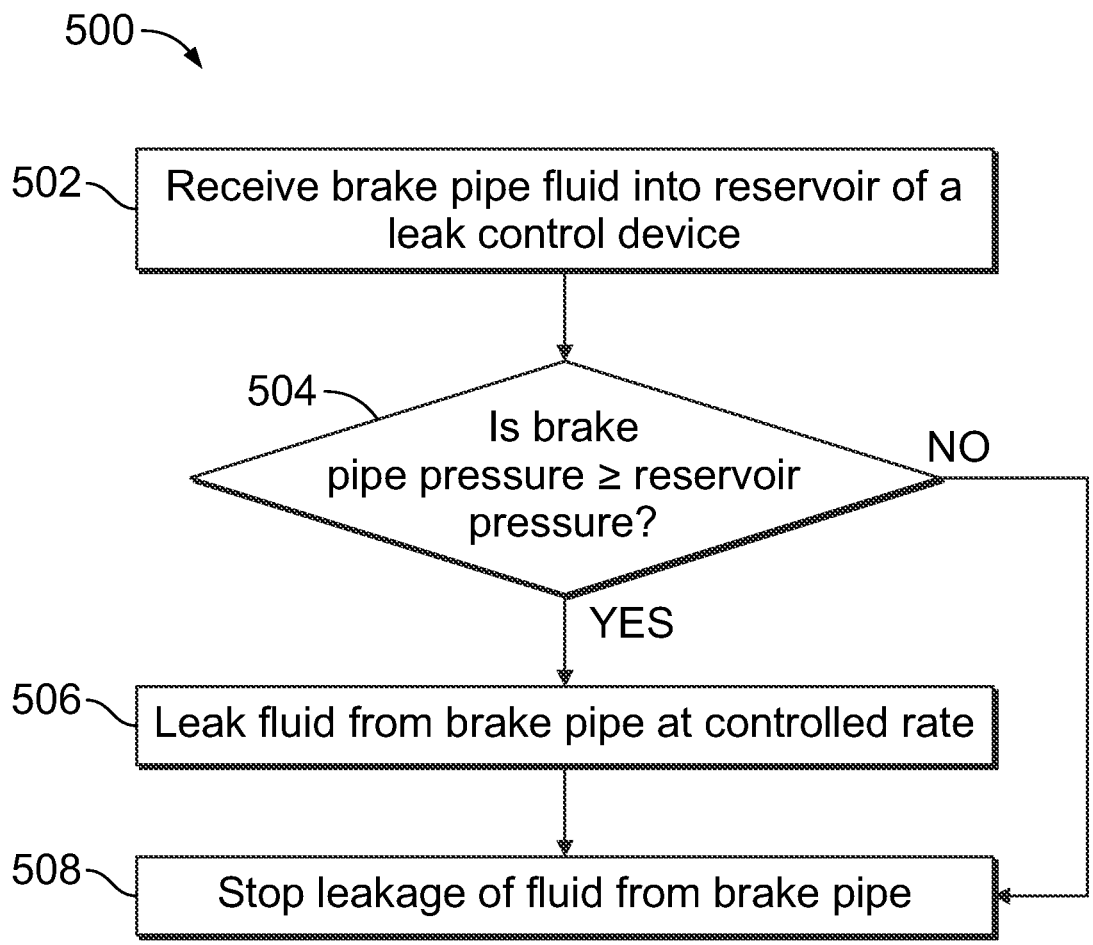
FIG. 5 illustrates a flowchart of one example of a method for detection of separation of a multi-vehicle system.

FIG. 5 illustrates a flowchart of one example of a method 500 for detection of separation of a multi-vehicle system. The method can represent operations performed by the controller, the leak detection device, and/or the EOVS device in the detection system 100. At step 502, fluid in a brake pipe of a vehicle system is received into a reservoir of a leak control device. The leak control device is fluidly coupled with the brake pipe at a location that is spaced apart from a compressor of the vehicle brake system that increases pressure of the fluid in the brake pipe. For example, the leak control device and the compressor may be onboard different vehicles with the break in the brake pipe located between the vehicles. The leak control device and the compressor may be on opposite ends of the vehicle system (e.g., the compressor may be onboard the front or leading vehicle and the leak control device may be on the rear or trailing vehicle in the vehicle system). Or the leak control device may be on the rear or trailing vehicle and the compressor on another vehicle, but not the front or leading vehicle. Or the compressor may be on the front or leading vehicle and the leak control device on another vehicle, but not the rear or trailing vehicle. Or the leak control device and the compressor on different vehicles, but not the front or leading vehicle and not the rear or trailing vehicle. The reservoir of the leak control device may be separate and a different reservoir or container than any reservoir of the compressor. For example, the reservoir of the leak control device may not be the main reservoir of the compressor or brake system.

At step 504, a decision is made as to whether the pressure of the fluid in the brake pipe is the same as (or greater than) the pressure of the fluid in the reservoir of the leak control device. If the fluid pressure in the brake pipe is no less than the fluid pressure in the reservoir, then the leak control device can allow leakage of the fluid from the brake pipe. As a result, flow of the method can proceed toward step 506 where a valve (e.g., a slide valve) in the leak control device remains in the open position or changes to the open position to allow fluid to leak out of the brake pipe via the leak control device. In the event of separation of the vehicle system resulting in a break of the brake pipe (with blockages in both segments of the brake pipe), then this controlled leak can allow for detection of the separation of the vehicle system, as described above. Flow of the method can return toward a prior operation, such as step 502 or step 504.

But if the fluid pressure in the brake pipe is less than the fluid pressure in the reservoir, then flow of the method can proceed toward step 508 where the valve in the leak control device changes to the closed position to stop the fluid from leaking out of the brake pipe via the leak control device. This can allow for the fluid pressure in the brake pipe to be maintained (e.g., for a brake application). Flow of the method can return toward a prior operation, such as step 502 or step 504. In this way, if the fluid pressure in the brake pipe later rises above the fluid pressure in the reservoir, then the valve may change or move to the open position to allow the leakage. As described above, leakage from the brake pipe can be allowed until the brake system of the vehicle is engaged and/or responsive to the vehicle system separating into multiple segments.

In one embodiment, a leak control device includes a reservoir that may be fluidly coupled with a brake pipe of a vehicle brake system and to receive a fluid in the brake pipe. The reservoir may be fluidly coupled with the brake pipe at a location that is spaced apart from a compressor of the vehicle brake system that increases a first pressure of the fluid in the brake pipe. The leak control device also includes a conduit fluidly coupled with the reservoir and having an orifice that may direct the fluid out of the reservoir at a leak rate. The leak control device includes a valve fluidly coupled with and disposed between the reservoir and the conduit. The valve may open and direct the fluid out of the reservoir and out of the vehicle brake system at the leak rate responsive to the first pressure of the fluid in the brake pipe being no less than a second pressure of the fluid in the reservoir.

The valve may close and stop leakage of the fluid out of the reservoir responsive to the first pressure of the fluid in the brake pipe being less than the second pressure of the fluid in the reservoir. The valve may remain open for the fluid in the reservoir and in the brake pipe to continue leaking out of the reservoir and the brake pipe responsive to a vehicle system that includes the vehicle brake system separating into multiple segments.

The orifice of the conduit can be positioned to direct the fluid out of the reservoir into an ambient environment outside of a vehicle system that includes the vehicle brake system. The orifice of the conduit can be adjustable and may change the leak rate of the fluid out of the reservoir and the brake pipe. The orifice of the conduit can be adjustable to change the leak rate based on a length of the brake pipe.

The valve may be a slide valve. The reservoir, the conduit, and the valve can be coupled with an EOT device to direct the fluid leaking out of the vehicle brake system via the orifice toward a turbine of the EOT device to power the EOT device. Optionally, the reservoir, conduit, and/or valve can be included in the EOT device. The EOT device can have a housing in which the reservoir, conduit (or at least a portion of the conduit), and the valve are disposed. This housing may then be coupled with the vehicle and the EOT device may communicate with the vehicle or one or more components onboard or off-board the vehicle via wireless and/or wired communications.

In another example, a method is provided that includes receiving fluid in a brake pipe of a vehicle brake system into a reservoir of a brake leakage device that is fluidly coupled with the brake pipe at a location that is spaced apart from a compressor of the vehicle brake system that increases a first pressure of the fluid in the brake pipe, and leaking the fluid out of the reservoir of the brake leakage device and out of the vehicle brake system via a conduit having an orifice. The fluid leaks out of the reservoir and the brake leakage device responsive to a first pressure of the fluid in the brake pipe being no less than a second pressure of the fluid in the reservoir. The method also includes stopping leakage of the fluid out of the reservoir and out of the vehicle brake system via the conduit having the orifice responsive to the first pressure of the fluid in the brake pipe being less than the second pressure of the fluid in the reservoir.

The leaking of fluid out of the reservoir continues until the vehicle brake system is engaged and responsive to a vehicle system that includes the vehicle brake system separating into multiple segments. The fluid can leak out of the reservoir via the orifice of the conduit into an ambient environment outside of a vehicle system that includes the vehicle brake system.

The method also can include changing a rate at which the fluid leaks out of the reservoir and the vehicle brake system. The rate at which the fluid leaks out of the reservoir can change based on a length of the brake pipe. Leaking of the fluid out of the reservoir and the vehicle brake system and stopping the leakage of the fluid out of the reservoir and the vehicle brake system can be performed by a slide valve.

The method also can include directing the fluid that is leaking out of the reservoir and the vehicle brake system toward a turbine of an end-of-train (EOT) device to power the EOT device.

In another example, a system includes a leading segment locator device configured to be disposed onboard a leading segment of a multi-vehicle system. The leading segment locator device that may determine locations of the leading segment of the multi-vehicle system. The system also includes a trailing segment locator device configured to be disposed onboard a trailing segment of the multi-vehicle system. The trailing segment locator device may determine locations of the trailing segment of the multi-vehicle system. The system includes a controller that may receive the locations of the leading segment of the multi-vehicle system from the leading segment locator device and the locations of the trailing segment of the multi-vehicle system from the trailing segment locator device. The controller may identify separation of the leading segment of the multi-vehicle system from the trailing segment of the multi-vehicle system based on the locations of the leading segment received from the leading segment locator device and the locations of the trailing segment received from the trailing segment locator device.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller may automatically slow or stop movement of the leading segment of the multi-vehicle system responsive to identifying the separation of the leading segment of the multi-vehicle system from the trailing segment of the multi-vehicle system. The trailing segment locator device may be disposed onboard the trailing segment of the multi-vehicle system that does not include any propulsion-generating vehicles that propel the trailing segment of the multi-vehicle system. Each of the leading segment locator device and the trailing segment locator device can include a global navigation satellite system receiver. The controller may identify the separation of the leading segment of the multi-vehicle system from the trailing segment of the multi-vehicle system responsive to the locations of the leading segment changing at a faster rate than the locations of the trailing segment.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A device comprising:
a reservoir configured to be fluidly coupled with a brake pipe of a vehicle brake system and to receive a fluid in the brake pipe, the reservoir configured to be fluidly coupled with the brake pipe in a location that is spaced apart from a compressor of the vehicle brake system that increases a first pressure of the fluid in the brake pipe;
a conduit fluidly coupled with the reservoir and having an orifice that is configured to direct the fluid out of the reservoir at a leak rate that is slower than a rate at which the compressor backfills the brake pipe with the fluid to prevent an emergency application of the vehicle brake system prior to the brake pipe breaking into separate segments; and
a valve fluidly coupled with and disposed between the reservoir and the conduit, the valve configured to open and direct the fluid out of the reservoir and out of the vehicle brake system at the leak rate responsive to the first pressure of the fluid in the brake pipe being no less than a second pressure of the fluid in the reservoir, the valve configured to remain open for the fluid in the reservoir and in the brake pipe to continue leaking out of the reservoir and the brake pipe responsive to a vehicle system that includes the vehicle brake system separating into multiple segments.

2. The device of claim 1, wherein the valve is configured to close and stop leakage of the fluid out of the reservoir responsive to the first pressure of the fluid in the brake pipe being less than the second pressure of the fluid in the reservoir.

3. The device of claim 1, wherein the orifice of the conduit is positioned to direct the fluid out of the reservoir into an ambient environment outside of a vehicle system that includes the vehicle brake system.

4. The device of claim 1, wherein the orifice of the conduit is adjustable and configured to change the leak rate of the fluid out of the reservoir and the brake pipe.

5. The device of claim 4, wherein the orifice of the conduit is adjustable to change the leak rate based on a length of the brake pipe.

6. The device of claim 1, wherein the valve is a slide valve.

7. The device of claim 1, wherein the reservoir, the conduit, and the valve are coupled with an end-of-train (EOT) device to direct the fluid leaking out of the vehicle brake system via the orifice toward a turbine of the EOT device to power the EOT device.

8. A method comprising:
receiving fluid in a brake pipe of a vehicle brake system into a reservoir of a brake leakage device that is fluidly coupled with the brake pipe in a location that is spaced apart from a compressor of the vehicle brake system that increases a first pressure of the fluid in the brake pipe;
leaking the fluid out of the reservoir of the brake leakage device and out of the vehicle brake system via a conduit having an orifice, the fluid leaking out of the reservoir and the brake leakage device responsive to a first pressure of the fluid in the brake pipe being no less than a second pressure of the fluid in the reservoir, the fluid leaking out of the reservoir at a leak rate that is slower than a rate at which the compressor backfills the brake pipe with the fluid to prevent an emergency application of the vehicle brake system prior to the brake pipe breaking into separate segments, the fluid leaking out of the reservoir continuing until the vehicle brake system is engaged and responsive to a vehicle system that includes the vehicle brake system separating into multiple segments; and
stopping leakage of the fluid out of the reservoir and out of the vehicle brake system via the conduit having the orifice responsive to the first pressure of the fluid in the brake pipe being less than the second pressure of the fluid in the reservoir.

9. The method of claim 8, wherein the fluid leaks out of the reservoir via the orifice of the conduit into an ambient environment outside of a vehicle system that includes the vehicle brake system.

10. The method of claim 8, further comprising:
changing the leak rate at which the fluid leaks out of the reservoir and the vehicle brake system.

11. The method of claim 10, wherein the leak rate at which the fluid leaks out of the reservoir changes based on a length of the brake pipe.

12. The method of claim 8, wherein leaking the fluid out of the reservoir and the vehicle brake system and stopping the leakage of the fluid out of the reservoir and the vehicle brake system is performed by a slide valve.

13. The method of claim 8, further comprising:
directing the fluid that is leaking out of the reservoir and the vehicle brake system toward a turbine of an end-of-train (EOT) device to power the EOT device.

14. A leak control device, comprising:
an inlet conduit configured to be fluidly coupled with a brake pipe of a multi-vehicle system in a location between a first vehicle having an onboard compressor that charges the brake pipe with fluid pressure and a second vehicle that is coupled with the first vehicle by at least the brake pipe, the first and second vehicles including brakes that are actuated based on the fluid pressure in the brake pipe;
an outlet conduit configured to be fluidly coupled with the inlet conduit and the brake pipe;
a leak conduit configured to be fluidly coupled with the inlet conduit and an external environment via a vent;
a reservoir fluidly coupled with the inlet conduit, the outlet conduit, and the leak conduit; and
a valve disposed between the inlet conduit, the outlet conduit, and the leak conduit, the valve configured to open and direct the fluid pressure in the reservoir to leak out of the reservoir and out of the brake pipe via the leak conduit and the vent at a leak rate that is slower than a charging rate at which the compressor increases the fluid pressure in the brake pipe, the valve configured to open responsive to the fluid pressure in the brake pipe being at least as great as the fluid pressure in the reservoir, the valve configured to remain open for the fluid in the reservoir and in the brake pipe to continue leaking out of the reservoir and the brake pipe responsive to the multi-vehicle system separating into multiple segments,
the valve configured to close and prevent the fluid pressure in the reservoir from leaking out of the reservoir and out of the brake pipe via the leak conduit and the vent at the leak rate, the valve configured to close responsive to the fluid pressure in the brake pipe being less than the fluid pressure.

15. The leak control device of claim 14, further comprising a turbine positioned to receive the fluid pressure flowing out of the vent via the leak conduit, the turbine configured to rotate from receipt of the fluid pressure flowing out of the vent to one or more of power one or more electronic components or charge one or more energy storage devices.

16. The leak control device of claim 14, wherein the valve includes a slide valve.

17. The leak control device of claim 14, wherein the valve is configured to open to leak the fluid pressure out of the brake pipe onboard rail vehicles of the multi-vehicle system.

18. The leak control device of claim 14, wherein the valve is configured to open to leak the fluid pressure out of the brake pipe onboard a truck and a trailer of the multi-vehicle system.

19. A device comprising:
a reservoir configured to be fluidly coupled with a brake pipe of a vehicle brake system and to receive a fluid in the brake pipe, the reservoir configured to be fluidly coupled with the brake pipe in a location that is spaced apart from a compressor of the vehicle brake system that increases a first pressure of the fluid in the brake pipe;
a conduit fluidly coupled with the reservoir and having an adjustable orifice that is configured to direct the fluid out of the reservoir at a leak rate that is slower than a rate at which the compressor backfills the brake pipe with the fluid to prevent an emergency application of the vehicle brake system prior to the brake pipe breaking into separate segments, the adjustable orifice configured to change the leak rate of the fluid out of the reservoir and the brake pipe; and
a valve fluidly coupled with and disposed between the reservoir and the conduit, the valve configured to open and direct the fluid out of the reservoir and out of the vehicle brake system at the leak rate responsive to the first pressure of the fluid in the brake pipe being no less than a second pressure of the fluid in the reservoir.

20. A device comprising:
a reservoir configured to be fluidly coupled with a brake pipe of a vehicle brake system and to receive a fluid in the brake pipe, the reservoir configured to be fluidly coupled with the brake pipe in a location that is spaced apart from a compressor of the vehicle brake system that increases a first pressure of the fluid in the brake pipe;
a conduit fluidly coupled with the reservoir and having an orifice that is configured to direct the fluid out of the reservoir at a leak rate that is slower than a rate at which the compressor backfills the brake pipe with the fluid to prevent an emergency application of the vehicle brake system prior to the brake pipe breaking into separate segments; and
a valve fluidly coupled with and disposed between the reservoir and the conduit, the valve configured to open and direct the fluid out of the reservoir and out of the vehicle brake system at the leak rate responsive to the first pressure of the fluid in the brake pipe being no less than a second pressure of the fluid in the reservoir,
wherein the reservoir, the conduit, and the valve are coupled with an end-of-train (EOT) device to direct the fluid leaking out of the vehicle brake system via the orifice toward a turbine of the EOT device to power the EOT device.

21. A method comprising:
receiving fluid in a brake pipe of a vehicle brake system into a reservoir of a brake leakage device that is fluidly coupled with the brake pipe in a location that is spaced apart from a compressor of the vehicle brake system that increases a first pressure of the fluid in the brake pipe;
leaking the fluid out of the reservoir of the brake leakage device and out of the vehicle brake system via a conduit having an orifice, the fluid leaking out of the reservoir and the brake leakage device responsive to a first pressure of the fluid in the brake pipe being no less than a second pressure of the fluid in the reservoir, the fluid leaking out of the reservoir at a leak rate that is slower than a rate at which the compressor backfills the brake pipe with the fluid to prevent an emergency application of the vehicle brake system prior to the brake pipe breaking into separate segments
directing the fluid that is leaking out of the reservoir and the vehicle brake system toward a turbine of an end-of-train (EOT) device to power the EOT device; and
stopping leakage of the fluid out of the reservoir and out of the vehicle brake system via the conduit having the orifice responsive to the first pressure of the fluid in the brake pipe being less than the second pressure of the fluid in the reservoir.

22. A leak control device, comprising:
an inlet conduit configured to be fluidly coupled with a brake pipe of a multi-vehicle system in a location between a first vehicle having an onboard compressor that charges the brake pipe with fluid pressure and a second vehicle that is coupled with the first vehicle by at least the brake pipe, the first and second vehicles including brakes that are actuated based on the fluid pressure in the brake pipe;
an outlet conduit configured to be fluidly coupled with the inlet conduit and the brake pipe;
a leak conduit configured to be fluidly coupled with the inlet conduit and an external environment via a vent;
a reservoir fluidly coupled with the inlet conduit, the outlet conduit, and the leak conduit;
a valve disposed between the inlet conduit, the outlet conduit, and the leak conduit, the valve configured to open and direct the fluid pressure in the reservoir to leak out of the reservoir and out of the brake pipe via the leak conduit and the vent at a leak rate that is slower than a charging rate at which the compressor increases the fluid pressure in the brake pipe, the valve configured to open responsive to the fluid pressure in the brake pipe being at least as great as the fluid pressure, the valve configured to close and prevent the fluid pressure in the reservoir from leaking out of the reservoir and out of the brake pipe via the leak conduit and the vent at the leak rate, the valve configured to close responsive to the fluid pressure in the brake pipe being less than the fluid pressure; and
a turbine positioned to receive the fluid pressure flowing out of the vent via the leak conduit and the vent, the turbine configured to rotate from receipt of the fluid pressure flowing out of the vent to one or more of power one or more electronic components or charge one or more energy storage devices.

* * * * *